United States Patent [19]

Ogura

[11] Patent Number: 4,980,784
[45] Date of Patent: Dec. 25, 1990

[54] MAGNETIC DISK APPARATUS

[75] Inventor: Shiro Ogura, Kamakura, Japan

[73] Assignee: Mitsubishi Denki Kabushiki Kaisha, Tokyo, Japan

[21] Appl. No.: 360,000

[22] Filed: Jun. 1, 1989

[30] Foreign Application Priority Data

Jun. 6, 1988 [JP] Japan .................................. 63-138933

[51] Int. Cl.$^5$ .............................................. G11B 5/596
[52] U.S. Cl. ................................ 360/77.11; 360/77.03
[58] Field of Search ............... 360/77.03, 77.05, 77.07, 360/77.08.77.11, 78.11

[56] References Cited

U.S. PATENT DOCUMENTS

| 4,516,177 | 5/1985 | Moon et al. ....................... | 360/77.03 |
| 4,524,397 | 6/1985 | Chalmers et al. ................. | 360/77.03 |
| 4,609,953 | 9/1986 | Mizuno et al. .................... | 360/78.13 |

FOREIGN PATENT DOCUMENTS 8606202 of 0000 PCT Int'l Appl. .............. 360/78.08

OTHER PUBLICATIONS

Fujitsu Limited, M2361A Mini-Disk Drives Ce Manual, Tokyo, Japan, 1985, pp. 4-68 to 4-87.

Primary Examiner—Aristotelis M. Psitos
Assistant Examiner—David L. Robertson
Attorney, Agent, or Firm—Wolf, Greenfield & Sacks

[57] ABSTRACT

In the magnetic disk apparatus according to the invention, the latch circuit latches the content of the logic signal provided from the comparative operational circuit at the end of the seek operation and holds the latched content during a track trace operation, and the linear position signal selected to constitute a closed loop positioning system is fixed to that at the end of seek operation for controlling the head position, so that recoverable allowance of the deviation from the center of the desired track (i.e., off-track amount) of the head at the time of the track trace operation can be increased to increase the reliability of seek operation.

7 Claims, 5 Drawing Sheets

F I G. 1
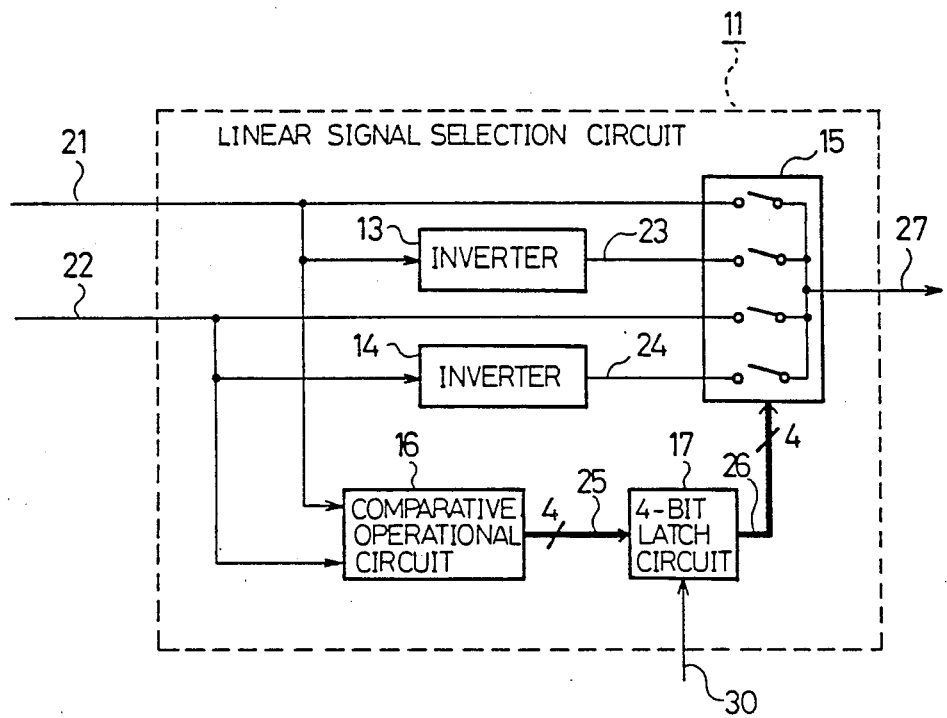

MAGNETIC DISK APPARATUS

BACKGROUND OF THE INVENTION

1. Field of the Invention

This invention relates to magnetic disk apparatuses and, more particularly, to improvement of reliability of the inter-track movement (or seek) operation of the head by a head positioning control system.

2. Description of the Prior Art

FIG. 3 is a view showing a head positioning control system for a prior art magnetic disk apparatus. Referring to FIG. 3, reference numeral 1 designates a magnetic disk. Position data written on the magnetic disk 1 is read out by a magnetic head 2 and converted by a position error signal detector 3 into a position error signal A 21 which is continuous and cyclic over all tracks and signal B 22 one-fourth cycle out of phase with respect to the signal A 21 (these signals being hereinafter referred to as position signals). The position signals A 22 and B 21 are fed to a track trace controller 4 and a track seek controller 5. When the head 2 is in an on-track state, a signal supplied from the track trace controller 4 is selected by a mode selection switch 7. When the head is moving between tracks, a signal from the track seek controller 5 is selected in the same way. The mode selection switch 7 provides a feedback control signal 28. The mode selection switch 7 is controlled by a mode control signal 30 provided from a mode controller 6. The feedback control signal 28 is converted by a power amplifier 8 into a current 29 supplied to a head drive motor 9. The head drive motor 9 generates power corresponding to the current 29 to drive an actuator 10 with the magnetic head 2 provided thereon. The magnetic head 2 is positioned to a desired position under control by the above closed loop.

The above system which uses two position signals one-fourth cycle out of phase with respect to each other is called a two-phase servo system. To form a closed loop with this system, the track trace controller 4 is required to include a compensation circuit 12 and a linear signal selection circuit 11 for selecting a signal as input to the compensation circuit 12 from among the position signals A and B and signals obtained by inverting the signals A and B. Japanese Patent No. Disclosure No. 52-4,209 discloses a typical prior art example of the linear signal selection circuit 11, having a structure as shown in FIG. 4. The operation of the circuit shown in FIG. 4 will now be described with reference to the timing chart shown in FIG. 5. As shown in FIG. 5, all the track is divided into two parts according to the level relation between the position signals A 22 and B 21. Logic signal X shows this relation. Further, with division of the track according to the level relation between the position signal A 22 and a signal obtained by inverting the position signal B 21, a logic signal Y is obtained, which is one-fourth phase out of phase with respect to the logic signal X. The combinations of the positive and negative parts of the two logic signals X and Y provide four different logic signals, i.e., linear region selection signals 25a to 25d. The process as described above is performed by the comparative operational circuit 16 shown in FIG. 4. An analog switch 15 provides only a linear position signal 27 selected by a linear region selection signal 25 from among the position signal A 22, inverted signal 24 obtained through an inverter 14, position signal B 21 and inverted signal 23 obtained through an inverter 13. In this way, a linear signal representing a position error with respect to the center of the closest track to the head 2 is used for closed loop control regardless of the head position.

In the magnetic disk apparatus as described above, the linear region selection at the time of the track trace operation is done passively by comparison of the levels of two position error signals. Therefore, if the overshoot from the desired track at the end of the seek operation as shown in FIG. 6 (showing a four-track seek) exceeds one half track, the content of the linear region selection signal is changed at this time to what selects a linear position signal showing the position error with respect to the center of the next track. Therefore, the head can not be returned to the desired track as shown by the dashed line, but is positioned to the next track as shown by the solid line. Designated at 25a to 25d are linear region selection signals at this time. In the Figure, an example is shown, in which the track seek control is switched over to the track trace control at the time of reaching of the center of the desired track. The overshoot at the time of the seek operation end is varied by external disturbances such as variations of the motor output torque and frictions and vibrations of mechanical sections. The positioning to an erroneous track (i.e., seek error) as described is conceivable in practice and constitutes a factor to reduce the reliability of the apparatus.

SUMMARY OF THE INVENTION

The present invention has been intended in order to overcome the above problems, and it has an object of providing a magnetic disk apparatus, which is free from positioning the head to an erroneous track even with an overshoot exceeding one half track at the end of a seek operation and has high reliability of the seek operation.

The magnetic disk apparatus according to the invention is provided with a latch circuit, which is controlled by a control circuit for controlling the selection of a track seek controller and a track trace controller to latch a logic signal from a comparative operational circuit at the time of switching of the track seek control over to the track trace control and hold the latched signal during the track trace control.

The above and other objects, features and advantages of the invention will become more apparent from the following description when taken in conjunction with the accompanying drawings.

BRIEF DESCRIPTION OF THE DRAWINGS

FIG. 1 is a block diagram showing a linear signal selection circuit in an embodiment of the invention;

1 . . . magnetic disk, 2 . . . magnetic head, 3 . . . position error signal sensor, 4 . . . track trace control circuit, 5 . . . seek control circuit, 6 . . . mode control circuit, 7 . . . mode switch, 8 . . . power amplifier, 9 . . . head driver motor, 10 . . . actuator, 11 . . . linear signal selection circuit, 12 . . . compensation circuit, 13, 14 . . .

inverter, 15 . . . analog switch, 16 . . . comparative operational circuit, 17 . . . 4-bit latch, 21 . . . position error signal B, 22 . . . position error signal A, 23, 24 . . . inverter signal, 25 . . . linear region selection signal (logic signal), 26 . . . output of 4-bit latch, 27 . . . linear position signal, 28 . . . feedback control signal, 29 . . . current, 30 . . . mode control signal.

DESCRIPTION OF THE PREFERRED EMBODIMENT

Figure 3:
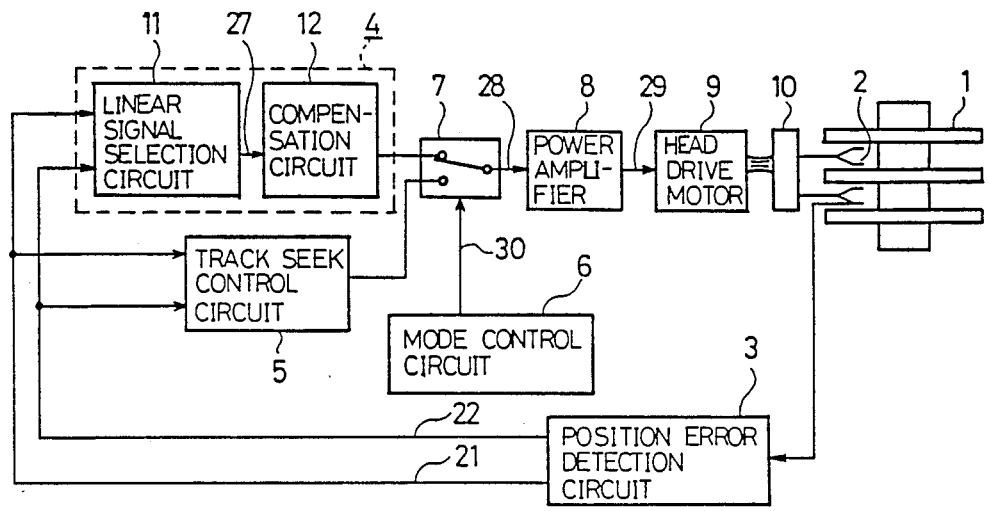
FIG. 3 is a block diagram showing a head positioning control system in the magnetic disk system.

Now, an embodiment of the invention will be described with reference to the drawings. The overall construction of the head positioning control system is the same as that described above with reference to FIG. 3, so it is neither illustrated nor described.

Figure 4:
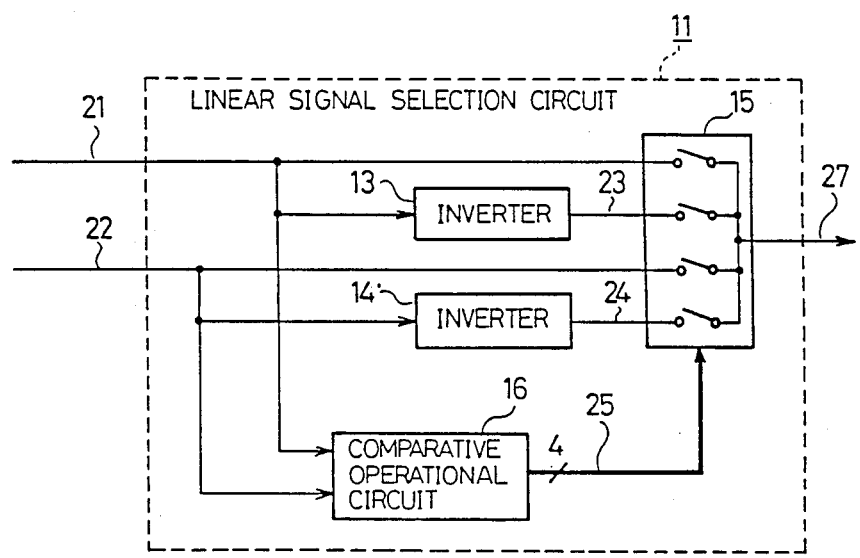
FIG. 4 is a block diagram showing a prior art linear signal selection circuit.

FIG. 1 shows an example of a linear signal selection circuit according to the invention. The illustrated circuit 11 includes a 4-bit latch 17 which is added to the prior circuit shown in FIG. 4. The 4-bit latch 17 is provided on a signal line, along which linear region selection signal 25 is supplied from comparative operational circuit 16 to analog switch 15, and it is controlled by a mode control signal 30 from the mode controller 6 shown in FIG. 3. While the mode control signal 30 shows track seek control, a linear region selection signal 25 from the comparative operational circuit 16 is supplied as such to the analog switch 15. The linear region selection signal 25 from the comparative operational circuit 16 is latched at the instant when the content of the mode control signal 30 is switched from track seek control over to track trace control, and during the track trace control this signal is held and provided to analog switch 15.

Figure 2:
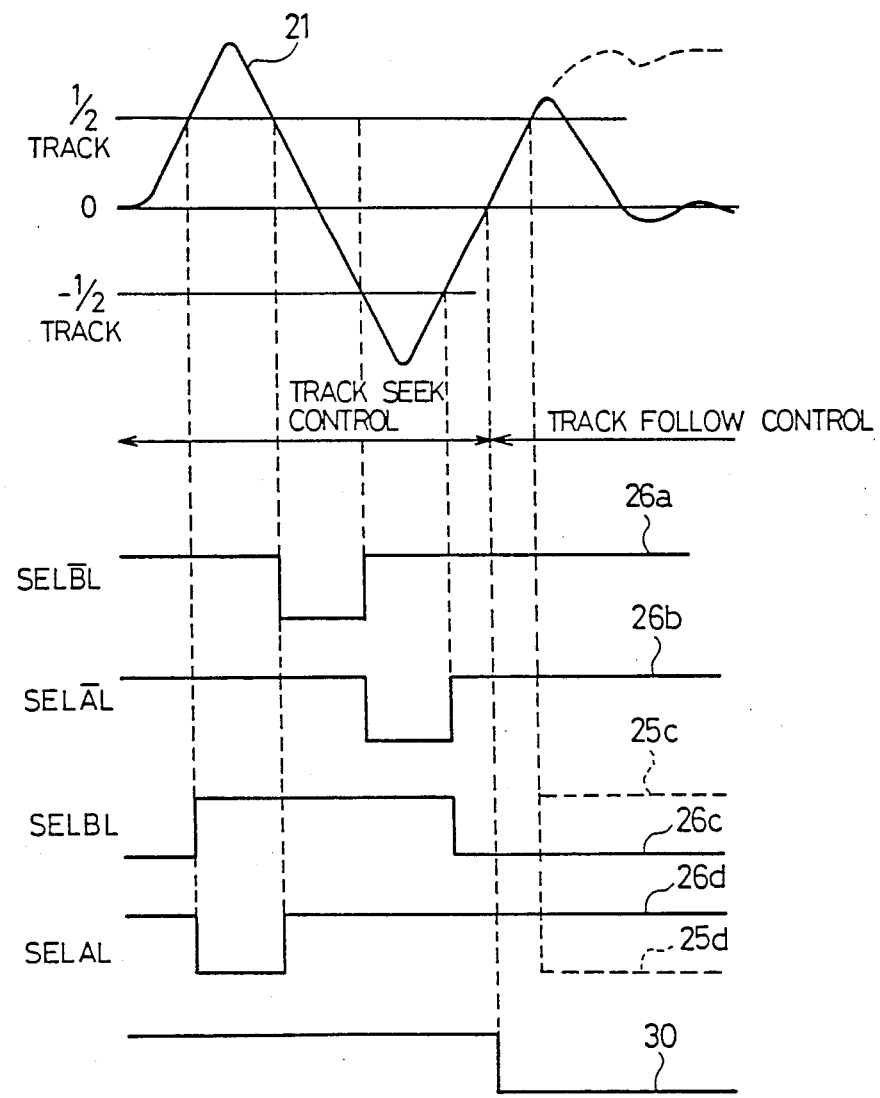
FIG. 2 is a timing chart showing an example of the seek operation according to the invention.

The operation of the circuit shown in FIG. 1 will be explained by using timing charts of FIGS. 2 and 5.

Figure 5:
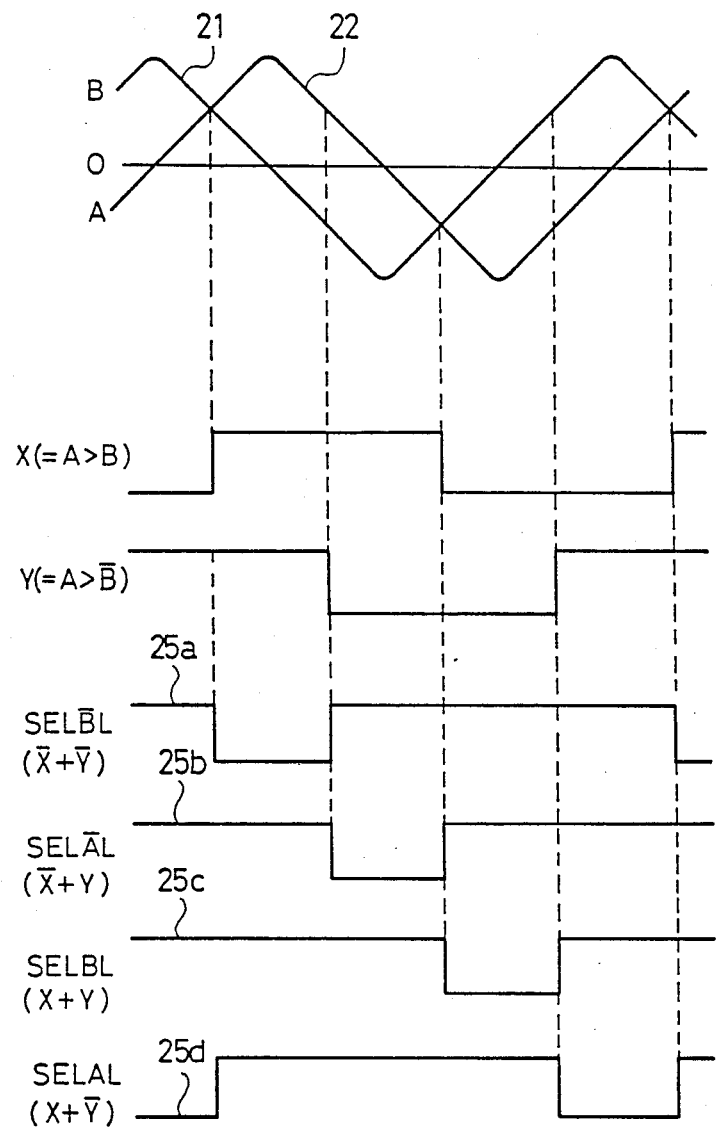
FIG. 5 is a timing chart showing operational principles of the linear signal selection circuit.
Figure 6:
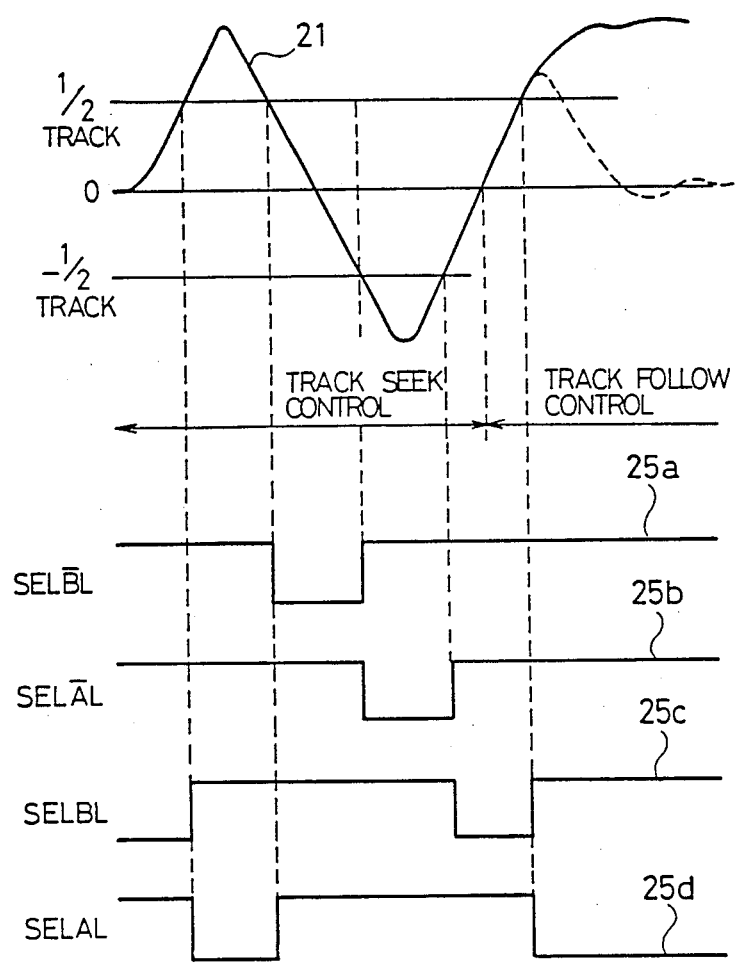
FIG. 6 is a timing chart showing a seek operation in the prior art example.

As shown in FIG. 5, all of the track region is divided into two parts according to the relation between the levels of the position signals A 22 and B 21. This relation is expressed by a logic signal X. When the division is done according to the relation between the levels of the position signal A 22 and signal obtained by inverting the position signal B 21, a logic signal Y is obtained, which is one-fourth cycle out of phase with respect to the logic signal X. Combinations of the positive and negative parts of these two logic signals X and Y provides four logic signals, i.e., linear region selection signals 25a to 25d. The comparative operational circuit 16 shown in FIG. 1 processes these signals. The circuit 16 provides the linear region selection signal 25 to the 4-bit latch circuit 17. The track seek operation thus is switched over to the track trace operation, and at the same time its content is held. This timing is controlled by the mode control signal 30. When the track seek operation is finished, a value of the linear region selection signal 25 at the end of the track seek operation is latched by the 4-bit latch 17 and this latched value is output as the output 26 during the track trace operation. The analog switch 15 provides only the signal selected according to the output 26 of the 4-bit latch 17 from among the position signal A 22, signal 24 obtained by inverting the signal A 22, position signal B 21 and signal 23 obtained by inverting the signal B 21 as linear position signal 27.

With this construction, even if the overshoot from the center of the desired track exceeds one-half track at the time of the seek operation (i.e., 4-track seek in the Figure), the phase of the position signal used for the closed loop control is not changed, so that the head can be positioned to the center of the desired track as shown in the Figure. The analog signal shown by the dashed line is the position signal B 21 when the prior art linear signal selection circuit 11 is used. The Figure shows the positioning to the next track, i.e., a seek error. This is due to the fact that the logic signal for controlling the analog switch 15 is changed at the instant when the overshoot exceeds one-half track as logic signals 25c and 25d as shown by dashed lines. In contrast, with the linear signal selection circuit 11 according to the invention the 4-bit latch 17 latches the linear region selection signal 25 at an instant when the mode control signal 30 shows the switching of the track seek control over to the track trace control, i.e., at the instant of falling of the mode control signal 30 as shown in FIG. 2, so that the output 26 controls the analog switch 15 as logic signals 26a to 26d as shown by solid lines in FIG. 2. Thus, the selected linear position signal 27 is fixed irrespective of the overshoot. As a result, unlike the prior art, there is no possibility of erroneously positioning the head to the next track. More particularly, as shown in FIG. 2, the recoverable permissible value of the deviation of the head from the center of the desired track (i.e., off-track extent) is expanded by four times. FIG. 2 shows an example, in which the switching from the track seek control over to the track trace control is done when the center of the desired track is reached by the head for the first time.

As has been described in the foregoing, according to the invention a latch is provided, which is controlled by a control circuit for controlling the selection of the track seek controller and track trace controller to latch a logic signal from the comparative operational circuit at the time of switching of the track seek control over to the track trace control and hold the latched content during the track trace control, and a sum of position error signals used for the closed loop control during trace control. Thus, the recoverable off-track extent of the head from the center of the desired track during the track trace control is increased by four times compared to the prior art, and particularly the redundancy of seek error due to excessive overshoot at the end of the seek operation. Thus, it is possible to obtain a highly reliable apparatus.

What is claimed is:

1. A magnetic disk apparatus comprising a position error signal detection circuit for detecting the position error of a head from the center of a track on a magnetic disk, to which said head is positioned, and providing two position error signals continuous over the entire track, cyclic and one-fourth cycle out of phase with respect to each other, a track seek control circuit for controlling the movement of said head between tracks, a track trace control circuit for controlling said head following the center of a track, said control circuits being operable according to said position error signals, a mode selection control circuit for controlling the selection of said track seek and trace circuits and supplying the output of either control circuit as feedback control signal to a head drive system, said track trace control circuit including a comparative operational circuit for generating, by comparison of the levels of said position error signals, a logic signal for selecting, from among said two position error signals and inverted signals obtained by inverting said position signals, a linear position signal necessary for forming a closed loop positioning system according to the head position, said closed loop positioning system effecting closed loop positioning control of said head by using a linear position signal selected during the track trace operation, and a latch circuit controlled by said control circuit to latch the logic signal produced by said comparative operational circuit at the time of switching from the track seek control over to the track trace control and hold the latched signal during the track trace control.

2. A magnetic disk apparatus according to claim 1, wherein position data is written on a magnetic disk.

3. A magnetic disk apparatus according to claim 1, wherein a mode control circuit selects said track trace control circuit while said head is in an on track state while selecting said track seek control circuit while said head is being moved between tracks and supplies the output of the selected circuit as a feedback signal to a head drive system.

4. A magnetic disk apparatus according to claim 1, which further comprises a mode switch for selecting signals from said track seek and trace control circuits according to a mode control signal provided from said mode selection control circuit and providing the selected signal as feedback control signal to said head drive system.

5. A magnetic disk apparatus according to claim 1, wherein said head drive system includes a power amplifier for converting current into a feedback control signal selected by said mode selection control circuit and a head drive motor for driving a head actuator for generating power according to current.

6. A magnetic disk apparatus according to claim 1, wherein said track trace control circuit includes a linear signal selection circuit for selecting a linear position signal necessary for constituting a closed loop position system from among said two position error signals and signals obtained by inverting said two position error signals according to the head position and a compensating circuit for receiving a linear position signal selected by said linear signal selection circuit and providing said received signal as a feedback control signal.

7. A magnetic disk apparatus according to claim 6, wherein said linear signal selection circuit includes an inverting circuit for inverting two position error signals provided form said position error signal detection circuit, a comparative operational circuit for generating four logic signals for selecting a linear position signal by comparison of the levels of said position error signals and providing said logic signals as linear region selection signals and an analog switch for receiving said two position error signals and signals obtained by inverting said position error signals and providing on a linear position signal selected according to said linear region selection signals, and which further comprises a 4-bit latch circuit provided on signal lines of said four linear region selection signals from said comparative operational circuit to said analog switch for providing the linear region selection signal from said comparative operational circuit as such to said analog switch while the mode selection signal from said mode selection control circuit represents track seek control and, at an instant when the content of said mode control signal is switched from the track seek control over to the track trace control, latching said linear region selection signal to hold it and provide it to said analog switch during the track trace control.

* * * * *